US006922888B2

(12) United States Patent
Barry et al.

(10) Patent No.: US 6,922,888 B2
(45) Date of Patent: Aug. 2, 2005

(54) LOADBREAK ELBOW PULLING TOOL APPARATUS

(75) Inventors: William E. Barry, Brookfield, WI (US); Todd K. Knapp, Waukesha, WI (US)

(73) Assignee: Speed Systems Inc., Brookfield, WI (US)

(*) Notice: Subject to any disclaimer, the term of this patent is extended or adjusted under 35 U.S.C. 154(b) by 214 days.

(21) Appl. No.: 10/154,079

(22) Filed: May 23, 2002

(65) Prior Publication Data

US 2002/0177352 A1 Nov. 28, 2002

Related U.S. Application Data

(60) Provisional application No. 60/293,573, filed on May 25, 2001.

(51) Int. Cl.[7] ................................................ B23P 19/00

(52) U.S. Cl. .......................... 29/758; 29/592.1; 29/759; 29/760; 29/762; 29/244; 29/270; 439/152; 439/153; 439/160; 439/372; 439/923

(58) Field of Search .......................... 29/244, 270, 278, 29/758–760, 762; 439/152, 153, 160, 372, 923

(56) References Cited

U.S. PATENT DOCUMENTS 1,893,414 A 1/1933 Johnson et al.
2,380,068 A 7/1945 Patton (Continued)

FOREIGN PATENT DOCUMENTS

JP 11150851 A * 6/1999 .......... H02G/15/06

OTHER PUBLICATIONS

"Extracting solid conductors from a single triangulated surface representation for interconnect analysis"; Sefler, J.F.; Neureuthe A.R.; Semiconductor Manufacturing, IEEE Transactions on , vol.: 9 , Issue: 1 , Feb. 1996; pp.: 82–86.*
Utility Solutions Inc., Elbow–Mule™ Loadbreak Elbow Puller.

(Continued)

*Primary Examiner*—Paul D Kim
(74) *Attorney, Agent, or Firm*—Boyle Fredrickson Newholm Stein & Gratz S.C.

(57) ABSTRACT

An attachment for a tool used to attach and remove load break elbows and protective caps from bushings disposed on a transformer is provided. The tool attachment includes an elbow engaging member that is positionable around a load break elbow or cap fixed to a bushing. The engagement member is fixedly secured to a horizontal bar that includes a number of aligned openings extending through the bar. These openings are selectively alignable with a pair of openings disposed on a vertical bar to pivotally attach the vertical and horizontal bars to one another. The vertical bar also includes an opening through which a pulling eye on the elbow or cap can extend when the tool attachment is positioned on the elbow or cap. A conventional pulling tool can be attached to the eye as it extends through the vertical bar and utilized in conjunction with a pulling rope secured to the vertical bar opposite the pivoting connection in order to quickly and easily remove the elbow or attach the elbow to a bushing without causing extended arcing.

20 Claims, 3 Drawing Sheets

U.S. PATENT DOCUMENTS

| | | | | | |
|---|---|---|---|---|---|
| 2,572,370 | A | | 10/1951 | Moeller | |
| 3,534,993 | A | | 10/1970 | Le Vesque, Sr. | |
| 3,627,367 | A | | 12/1971 | Levy | |
| 3,739,452 | A | | 6/1973 | Gadberry | |
| 4,034,542 | A | | 7/1977 | Loehr | |
| 4,101,088 | A | | 7/1978 | Stauth | |
| 4,132,441 | A | | 1/1979 | Watkins | |
| 4,173,365 | A | | 11/1979 | Lieb | |
| 4,483,058 | A | | 11/1984 | Clutter et al. | |
| 4,525,006 | A | | 6/1985 | Nowak et al. | |
| 4,703,549 | A | | 11/1987 | Grandt | |
| 4,711,482 | A | | 12/1987 | Brown et al. | |
| 4,784,610 | A | * | 11/1988 | Stuart | 439/144 |
| 4,821,392 | A | * | 4/1989 | Layland, Jr. | 29/267 |
| 5,030,120 | A | * | 7/1991 | Hartley | 439/144 |
| 5,190,331 | A | | 3/1993 | Corbin | |
| 5,487,579 | A | | 1/1996 | Woodruff | |
| 5,504,982 | A | | 4/1996 | Sharp | |
| 5,507,084 | A | | 4/1996 | Richter | |
| 5,691,859 | A | | 11/1997 | Ulrich et al. | |
| 5,765,453 | A | | 6/1998 | Mims | |
| 5,768,047 | A | | 6/1998 | Ulrich et al. | |
| 5,857,862 | A | * | 1/1999 | Muench et al. | 439/181 |
| 5,934,139 | A | | 8/1999 | Tucker | |
| 6,148,929 | A | | 11/2000 | Winters | |
| 6,299,228 | B1 | | 10/2001 | Shin | |

OTHER PUBLICATIONS

Low Voltage Terminations, p. 7.
200 A, 15 kV Class Loadbreak Junction—Jun. 1987 Section 1414–1.
200 A, 15 kV Class Loadbreak Elbow Connector—Jun. 1987 Section 1411–1.
200 A, 15 kV Class Insulated Protective Cap—Jun. 1987 Section 1419–1.
Fresco, Inc.—Dis–Stik URD Disconnect Tools.
A.B. Chance Company—Elbow Puller Tools.
A.B. Chance Company—Elbow Connector Tool.
RTE Corporation—Installation Notes Scrubline 100 KVA.
Installation Notes Loop Feed RanchRunner II.

* cited by examiner

LOADBREAK ELBOW PULLING TOOL APPARATUS

CROSS REFERENCE TO RELATED APPLICATION

This application claims priority under 35 U.S.C. §119(e) to U.S. Provisional Patent Application No. 60/293,573, filed May 25, 2001, the entirety of which is incorporated by reference herein.

FIELD OF THE INVENTION

The present invention relates to tools for connecting and disconnecting loadbreak elbows and protective caps positioned on bushings disposed on an electrical distribution transformer, loadbreak junction or standoff insulator and more specifically to an attachment used with an elbow pulling tool.

DESCRIPTION OF THE RELATED ART

Electrical distribution transformers are used for voltage transformation in a distribution system. Transformers designed for underground cable connections have been used by electrical utilities since the late 1960s and include insulated bushings that protrude from the transformer. The bushings are designed to connect to cables connected to a power source opposite the bushings that supply high voltage electricity to the transformer. The cables feeding the high voltage to the transformer commonly terminate with a pre-molded loadbreak elbow. A loadbreak elbow is essentially an insulated connector attached to the end of an electrical cable that is designed to plug into the transformer bushings so that the elbow may be disconnected under load.

The bushing is an insulated structure made from ceramic, a plastic, rubber, or the like. The insulating material forming the bushing prevents energized cables connected to the transformer from coming into contact with one another. When the bushing is not in use, an insulated protective cap is to cover the open, unused bushing.

Typically, the elbow or cap and bushing components are coated with a lubricating substance like a silicone grease to aide in connecting and disconnecting the elbow or cap to and from the bushing. However, over time the silicone grease tends to harden, and loses its effectiveness due to, for example, heat-aging. As a result, a firm, cementeous bond is established between the elbow or cap and the bushing, making the elbow or cap extremely difficult to disconnect from the bushing. Further, this problem is often aggravated since in most occasions the elbows or caps are disconnected from the bushings very infrequently, often after a number of years of use, which allows the grease to become extremely hard.

To assist in the removal of the elbows or caps which are stuck to a bushing, both the loadbreak elbow and protective cap are designed with an integral pulling eyelet located on the elbow or cap opposite the bushing. The eyelet is designed for use with tools specifically designed to engage the eyelet and remove the elbow or cap from the bushing.

Over the years there have been several tools designed for this particular use of engaging the pulling eyelet to remove stuck elbows and caps. One of these types of tools is known in the industry as a "hotstick." A hotstick is a tool used by utility operating personnel during the connection and disconnection of loadbreak elbows and protective caps from the bushings. A hotstick is essentially an elongated, insulated rod with a manually manipulatable gripper assembly at one end that selectively engages the pulling eye and permits the removal of the elbow even when the cable contained within the elbow is energized. One particular type of hotstick know as a "shotgun" has a gripper assembly that includes a hook that engages the eyelet on the elbow that is moved into and out of engagement with the eye by a collar slidably mounted to the rod and connected to the hook. However, due to the lack of any mechanical advantage provided by the hotstick, the hotstick is often unsuccessful, even after repeated attempts, in disconnecting an elbow or cap that is seized onto the bushing by hardened silicone grease.

As a result, a number of alternative hotstick designs have been created to mechanically aid the operator of the tool in engaging the pulling eyelet to more easily remove the elbow from the bushing. For example, U.S. Pat. No. 3,534,993 (Le Vesque) describes a hotstick and clamping mechanism incorporated into one tool. The working end of the tool includes vinyl coated jaws disposed on manually manipulatable operating arms formed of chrome-plated vinyl. The tool can be rotated to engage the end of the elbow within the jaws that form snuggly around the elbow as the tool grasps the elbow. The jaws operate to hold the elbow stationary while the tool is operated to ease the removal of the elbow.

Another example is U.S. Pat. No. 4,483,058 (Clutter), which discloses an impact hammer elbow tool. This tool has an integral hook disposed between a pair of movable gripping jaws on the tool head that fits through the pulling eye of an elbow or a bushing cap. The tool also includes a tubular hammer that can selectively engage an anvil disposed on the tool to deliver a force to the elbow in order to attach or remove the elbow from the bushing.

Each of the above-mentioned tools have, however, proven to be less than satisfactory in disconnecting loadbreak elbows from transformer bushings. Specifically, these devices do not provide a sufficient force directed to the elbow to allow the elbow to be quickly removed from the bushing. In situations when an electrical load is applied through the cable disposed within the bushing and elbow, the slow removal of the elbow from the bushing allows arcing to occur between the elbow and the bushing, which creates a significant risk to the individual removing the elbow. Accordingly, it is desirable to develop an improved loadbreak elbow pulling tool that allows an elbow to be removed more quickly.

SUMMARY OF THE INVENTION

It is an object of the present invention to provide an elbow or protective cap pulling tool apparatus capable of effectively transmitting the pulling force of the pulling tool to the elbow or cap to effect a quick release of the elbow or cap from a bushing.

It is another object of the present invention to provide a pulling tool attachment that can be utilized with a wide range of conventional operating sticks.

It is still another object of the present invention to provide a pulling tool attachment that can be utilized with elbows installed on varying styles and makes of components.

It is still further object of the present invention to provide a pulling tool attachment that has a simple and easy to utilize construction.

The present invention is an attachment for an elbow pulling tool that increases the effectiveness and the transmission of the pulling force from the tool to the elbow to effect a quicker and less dangerous release of the elbow from a bushing disposed on a transformer. The tool attachment includes a guide tube adapted to be positioned around a horizontal portion of an elbow that is secured to the bushing. The guide tube supports an adjuster bar that includes a number of aligned pairs of apertures spaced from the guide tube. A lever is pivotally secured to the adjuster bar by a removable pin inserted through the lever and one of the aligned pairs of apertures in the adjuster bar. The lever also includes an opening alignable with the pulling eye extending outwardly from the elbow opposite the bushing. The opening enables a conventional hotstick or shotgun stick to be attached in a known manner to the eye which extends through the opening in the lever. Also, the lever includes a pulling rope mounting hole opposite the adjuster bar to which a hook can be releasably attached that is secured to one end of a pulling rope.

To use the tool attachment to remove an elbow secured to a bushing on a transformer, in a preferred method first the pin is positioned in the appropriate pair of aligned apertures for the elbow to be removed. The tool attachment is then positioned around the elbow such that the guide tube encircles the elbow and abuts and engages the base of the bushing. The pulling rope and hotstick are then attached to the rope mounting hole and pulling eye, respectively, and a rearward force is applied to the lever and pulling eye through both the rope and hotstick. This rearward force pivots the lever with respect to the adjuster bar and guide tube, urging the guide tube forwardly into engagement with the base of the bushing, and enabling the elbow seal to be broken, followed by a quick removal off of the bushing.

Other objects and advantages of the present invention will be made apparent from the following detailed description taken together with the drawing figures.

BRIEF DESCRIPTION OF THE DRAWINGS

Preferred exemplary embodiments of the invention are illustrated in the following drawings.

In the drawings.

DETAILED DESCRIPTION

Figure 2:
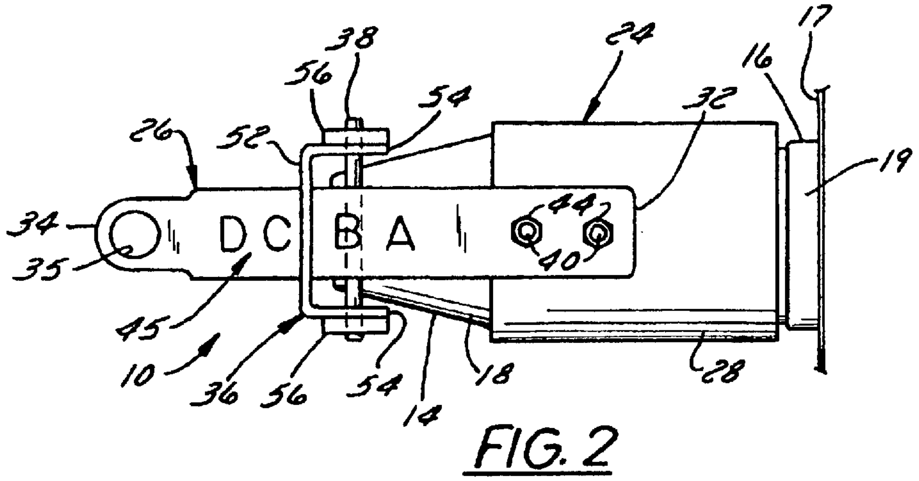
FIG. 2 is a top plan view of the elbow pulling tool attachment of FIG. 1.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting the invention.

Figure 1:
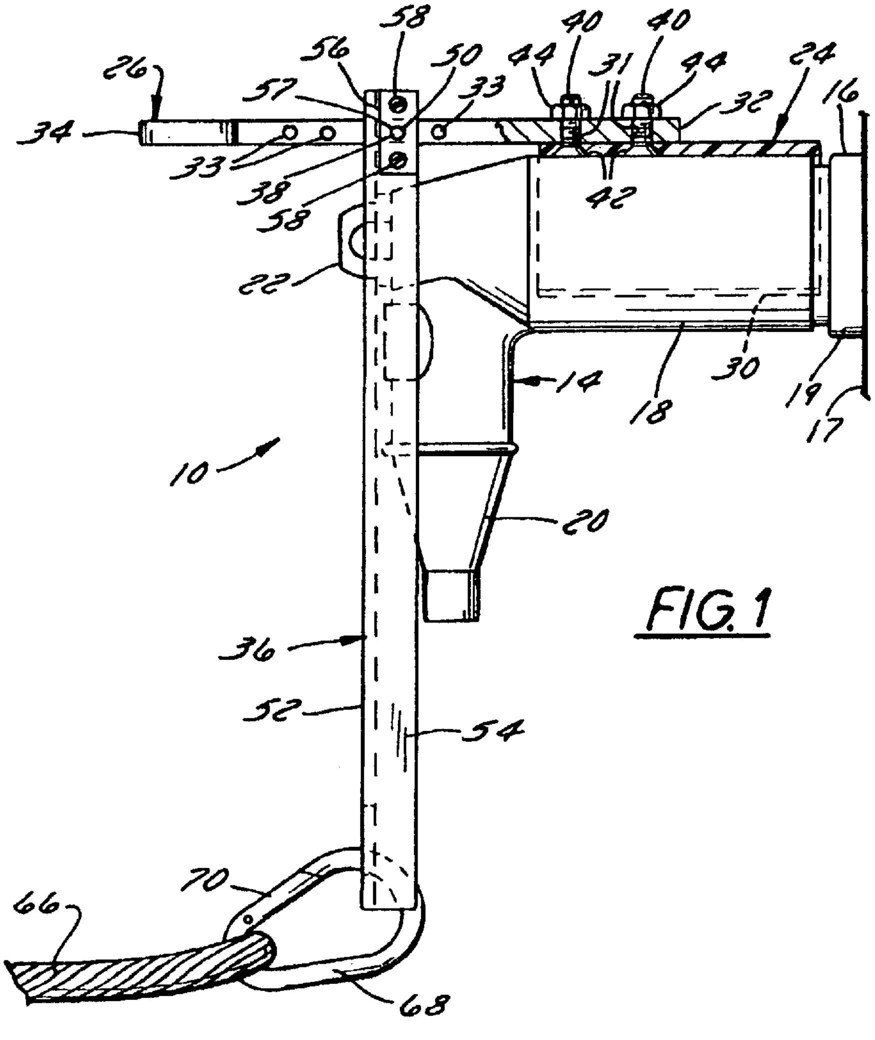
FIG. 1 is a side elevation view of an elbow pulling tool attachment constructed in accordance with the invention positioned on a load break elbow.
Figure 4:
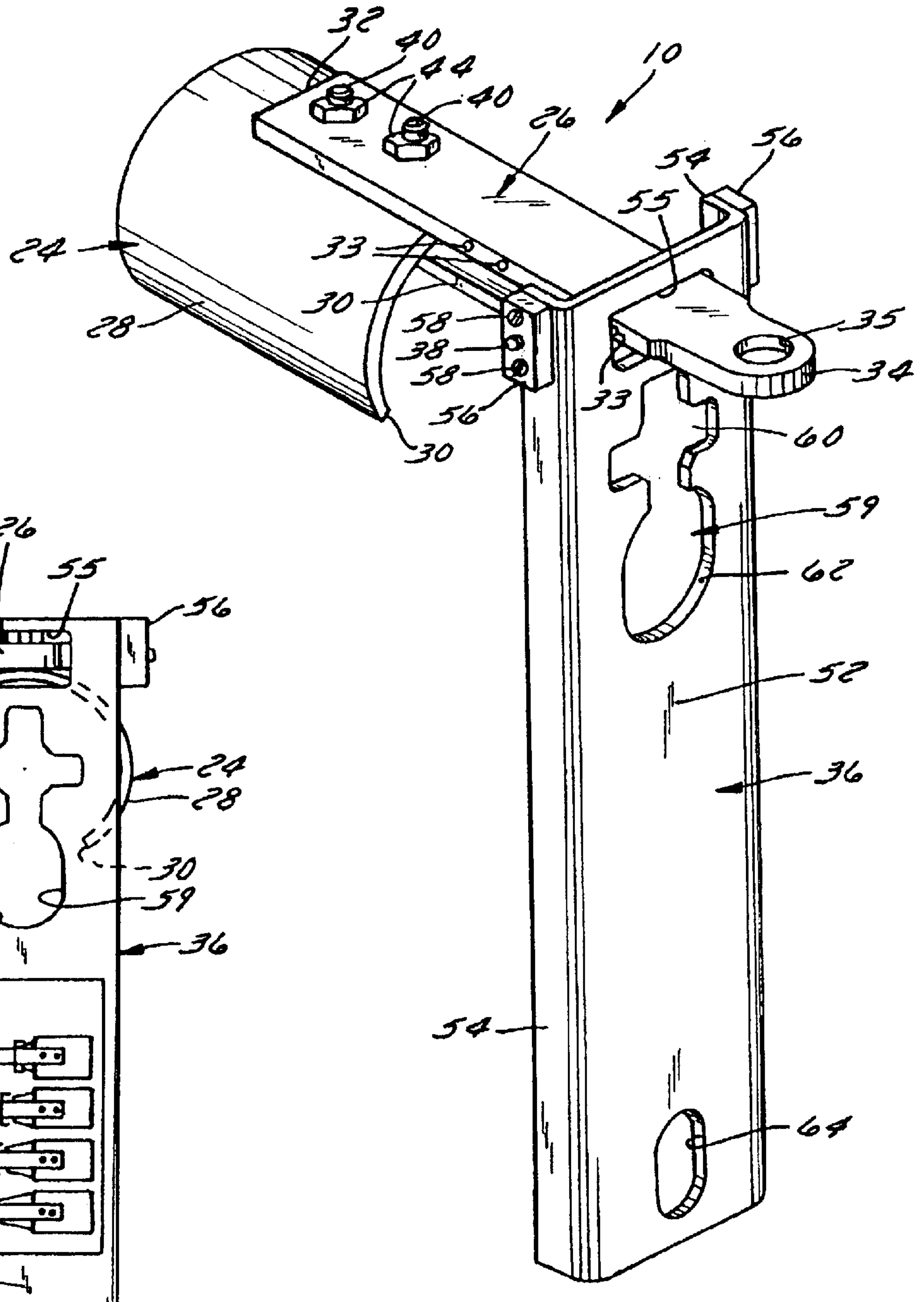
FIG. 4 is a perspective view of the elbow pulling tool attachment of FIG. 1.
Figure 3:
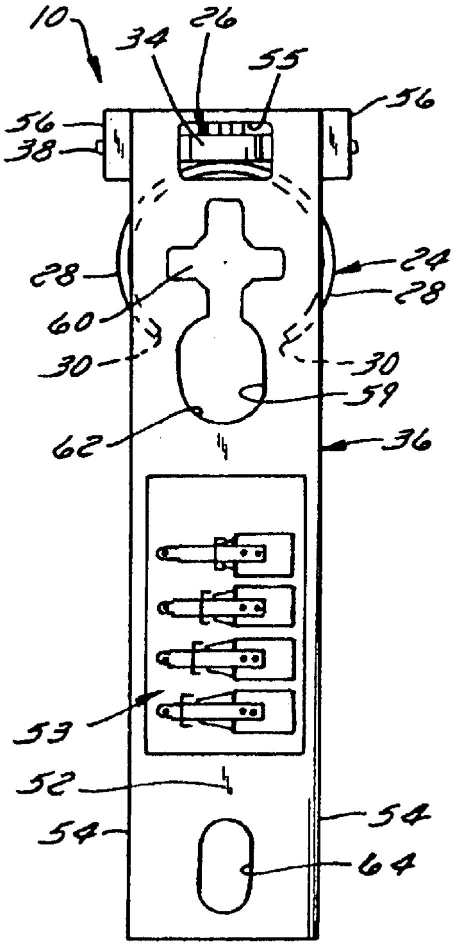
FIG. 3 is a front elevation view of the elbow pulling tool attachment of FIG. 1.

With reference now to the drawing figures in which like reference numerals represent like numerals throughout the disclosure, an elbow pulling tool attachment is indicated generally at 10 in FIG. 1. The tool attachment 10 is designed to be utilized with a standard elbow pulling tool or hotstick 12, such as a shotgun stick, which utility companies use in installing and removing loadbreak elbows 14 and/or insulated protective caps (not shown). The tool attachment 10 is used with the hotstick 12 to remove insulated plug members, such as protective caps and load break elbows 14, disposed on transformer bushings 16, or on a conventional feed through module (loadbreak junctions) or stand off (not shown) as are known in the art. An example of a suitable hotstick 12 is the Serial No. 3100 tool made by Hastings of Hastings, Mich.

The construction of the tool attachment 10 described herein is adaptable to remove elbows 14 and caps used with these bushings 16 in multiple applications. More specifically, there are three voltage classes for load break systems: namely, 15 kilovolts (KV), 25 KV, and 35 KV. A single tool attachment 10 is able to remove elbows 14 attached to both the 15 KV and 25 KV components because of their similarity in size. A separate size tool attachment 10 is required for the 35 KV Cooper Industries components because they are significantly larger than the 15 KV and 25 KV components.

The elbows 14 are generally L-shaped including a horizontal portion 18 engaged with the bushing 16 that extend outwardly from the transformer 17 and includes a base 19 disposed against the transformer 17, and a vertical portion 20 perpendicularly connected to the horizontal portion 18 and disposed opposite the bushing 16. A pulling loop or eye 22 is disposed on the vertical portion 20 and extends in a direction opposite the horizontal portion 18. The elbow 14 can be formed of an insulating material, such as rubber, and the eye 22 is formed of a steel-reinforced rubber material secured to the elbow 14.

Referring now to FIGS. 1–4, in a preferred embodiment the elbow pulling tool attachment 10 includes a guide/push tube 24, an adjuster bar 26 attached to the tube 24, and a channel lever 36 pivotally attached to the adjuster bar 26 by a clevis pin 38.

The guide/push tube 24 is generally cylindrical in shape and is formed with a partial cylindrical side wall 28 that includes a longitudinal slot 30 extending along the entire length of the tube 24. The side wall 28 has a diameter that is at least slightly larger than the diameter of the horizontal portion 18 of the elbow 14, and a length approximately equal to the length of the horizontal portion 18. The slot 30 is positioned such that the side wall 28 preferably covers an angle of approximately 235° from one end of the slot 30 around the side wall 28 to the opposite end of the slot 30. However, the slot 30 may also be reduced or enlarged in size such that the angle formed by opposite ends of the slot 30 is between 200° and 270°, so long as the slot 30 is narrower than the width of the horizontal portion 18 and larger than the width of the vertical portion 20 of the elbow 14 such that the tube 24 can effectively engage the horizontal portion 18 of the elbow 14. The tube 24 is also preferably made of a clear material such that the elbow 14 or cap being removed by the tool attachment 10 can be easily seen through the tube 24 when the tool 10 and tube 24 are attached to the elbow 14. However, the tube 24 can be formed of any suitable generally rigid, electrically insulative material.

The adjuster bar 26 is generally rectangular in shape and includes a pair of attachment openings 31 disposed adjacent first end 32 of the adjuster bar 26, a number of pairs of aligned openings 33 spaced from the first end 32 and one another and extending through the bar 26, and a second end 34 opposite the first end 32 and including a bore 35 extending therethrough perpendicular to openings 33. The adjuster bar 26 is secured to the tube 24 by the insertion of a pair of screws 40 through openings 42 in the tube 24 disposed directly opposite the slot 30. The screws 40 extend outwardly from the openings 42 and through the attachment openings 31 in the adjuster bar 26, and are secured therein by a pair of nuts 44 threadably engaged with the screws 40 opposite the tube 24. The adjuster bar 26 is preferably formed of a generally rigid material, and includes indicia 45 printed on one side of the adjuster bar 26 which indicate where the lever 36 should be pivotally attached to the adjuster bar 26 in order to remove an elbow 14 having a specific size, as the openings 33 serve to align the particular cap or elbow 14 with the pivot point of the bar 26 and lever 36.

The clevis pin 38 used to pivotally attach the channel lever 36 to the adjuster bar 26 insertable through one of the aligned pairs of openings 33 disposed on the adjuster bar 26. The pin 38 is also inserted through a pair of aligned apertures 50 disposed on opposite sides of the channel lever 36. The lever 36 is generally rectangular in shape and includes a central body portion 52 with tool positioning indicia 53 and a pair of opposed side walls 54 that extend perpendicularly outwardly from opposite sides of the body portion 52 parallel to one another. The central body portion 52 includes an upper opening 55 disposed adjacent one end of the body portion 52 in alignment with the apertures 50 located in each side wall 54. The upper opening 55 is generally rectangular in shape and is adapted to receive the adjuster bar 26 therethrough, such that the pairs of aligned openings 33 on the adjuster bar 26 can be selectively aligned with the apertures 50 disposed in the side walls 54. Thus, the clevis pin 38 can be inserted through the apertures 50 and aligned openings 33 to pivotally secure the adjuster bar 26 and channel lever 36 to one another. Further, to increase the strength of the lever 36 around the apertures 50, a pair of reinforcing plates 56 are disposed on the side walls 54. The plates 56 include openings 57 aligned with the apertures 50, and are secured to the side walls by screws 58. The plates 57 can be disposed on either side of the side walls 54 and are preferably formed of a material similar to that of the lever 36.

The channel lever 36 also includes a middle opening 59 disposed within the body portion 52 below the upper opening 55. The middle opening 59 is adapted to be positioned against the corner of the elbow 14 such that the pulling eye 22 can extend through an upper, cross-like portion 60 of the middle opening 59. The cross-like portion 60 is able to allow an eye 22 that is oriented in a horizontal or vertical plane on the elbow 14. The middle opening 59 also includes a lower oval portion 62 that is adapted to receive the eye 22 therethrough such that the gripping end of the hotstick 12 can be secured to the eye 22.

Finally, the channel lever 36 includes a lower opening 64 disposed approximately opposite the upper opening 55 that is generally oval in shape and is adapted to enable a pulling rope 66 to be secured to the lever 36. The rope 66 includes a detachable hook 68 secured to one end that can be selectively opened and inserted through the lower opening 64 in order to secure the rope 66 to the lever 36 at the lower opening 64.

Figure 5:
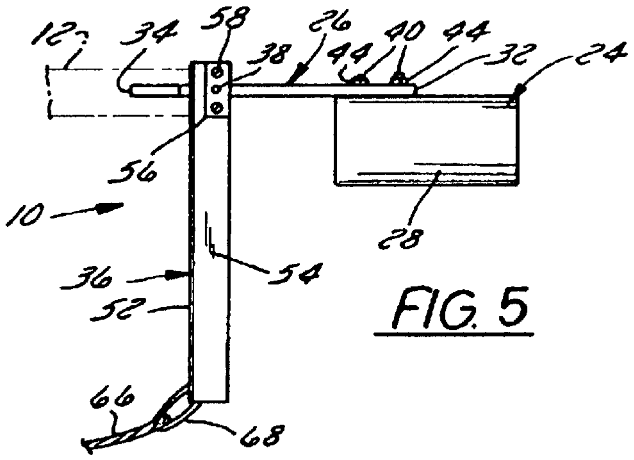
FIGS. 5–7 are consecutive side elevation views illustrating the steps for using the elbow pulling tool attachment to remove a loadbreak elbow from a transformer bushing.
Figure 6:
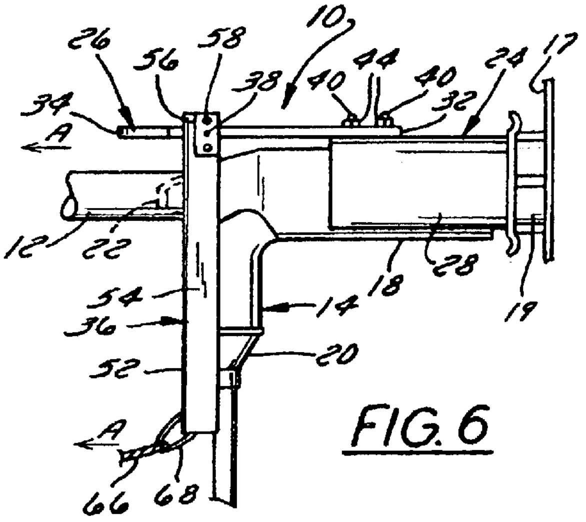
Figure 7:
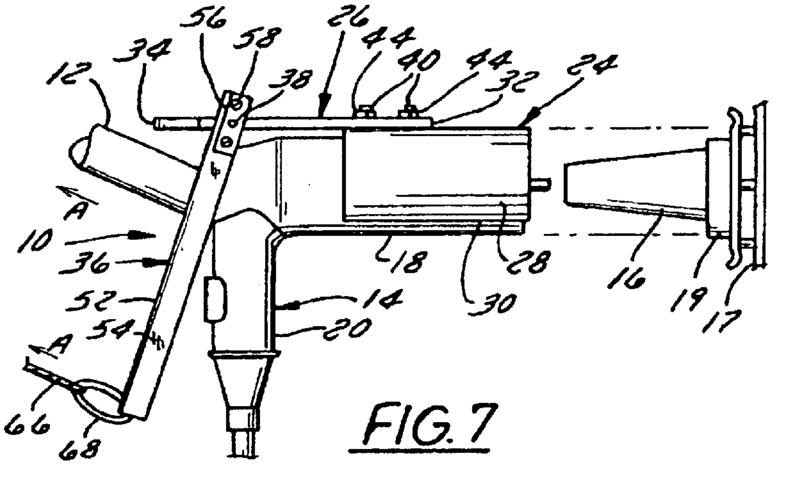

Referring now to FIGS. 5–7, in order to remove an elbow 14 from a bushing 16 extending outwardly from a transformer 17, initially the adjuster bar 26 is inserted through the upper opening 55 in the channel lever 36 until the desired pair of aligned openings 33 are in alignment with the opposed apertures 50 in the side walls 54 of the lever 36. A 90° angle between adjuster bar 26 and channel lever 36 is the optimum position. The pin 38 is then inserted through the apertures 50 and the selected pair of aligned openings 33 to pivotally secure the adjuster bar 26 and channel lever 36 to one another.

After the adjuster bar 26 is secured to the lever 36, the hotstick 12 is engaged with the bore 35 on the second end 34 of the adjuster bar 26. After the hotstick 12 is rigidly attached to the adjuster bar 26, the attachment 10 is positioned in alignment with the elbow 14 such that the pulling eye 22 is aligned with the cross-like portion 60 of the middle opening 59. The attachment 10 is then slid over the elbow 14, such that the tube 24 is positioned around the horizontal portion 18 of the elbow 14, and the pulling eye 22 extends through the middle opening 59. The hotstick 12 is then removed from the adjuster bar 28, leaving the tool attachment 10 engaged with the elbow 14.

With the tool attachment 10 positioned on the elbow 14, the hook 68 (which is attached to the pulling rope 66) is inserted through the lower opening 64 on the lever 36. The hook 68 is engaged with the lower opening 64 such that the hook 68 and rope 66 cannot become disengaged from the lever 36 while the tool attachment 10 is being utilized. In a preferred embodiment, the hook 68 is formed similarly to a carabiner having a pivoted and spring-biased portion 70 of the hook 68 being movable to releasably attach the hook 68 to the lower opening 64.

The hotstick 12 is then reengaged with the pulling eye 22 in a conventional manner, and the hotstick 12 and pulling rope 66 are pulled upwardly and rearwardly with respect to the elbow 14 in the direction indicated by arrows A in FIG. 7. Initially, the hotstick 12 and rope 66 are pulled rearwardly at the same time with a slow, steady pull or force applied to the elbow 14, until a release of the elbow 14 from the bushing 16 is felt through the hotstick 12 and rope 66. This force is transmitted to the base 19 of the bushing 16 by the tube 24, such that the force exerted on the hotstick 12 by the individual both pulls the elbow 14 via the eye 22, and pushes the elbow 14 away from the bushing 16 via the tube 24.

More specifically, when using the attachment 10, the particular positioning of the hotstick 12 and rope 66 on the tool attachment 10 provides an approximate 6:1 mechanical advantage in removing the elbow 14 from the bushing 16, such that the tool attachment 10 allows any hardened lubricant between the elbow 14 and the bushing 16 to be easily broken. After the release is felt, the hotstick 12 and rope 66 are pulled quickly in a rearward direction to completely remove the elbow 14 from the bushing 16. Further, with the ability of the hotstick 12 and rope 66 to move the elbow 14 a relatively large difference in a short time the removal of the elbow 14 using the tool attachment 10 avoids dangerous arcing conditions that can result from a slower, gradual load break using only the hotstick 12. After the elbow 14 is removed, it can be positioned on a stand-off insulator (not shown) positioned on the transformer 17 by using the attachment 10 and tool 12 to push the elbow 14 onto the insulator.

Figure 8:
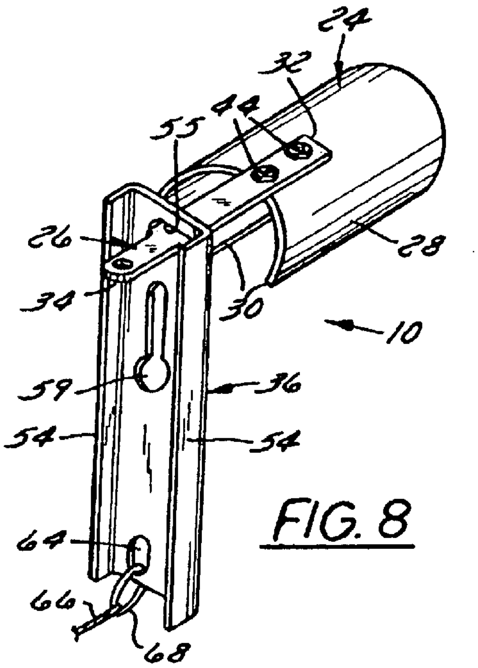
FIG. 8 is a perspective view of a second embodiment of the tool attachment of FIG. 1.

It is understood that various preferred embodiments are shown and described above to illustrate different possible features of the invention and the varying ways in which these features may be combined. For example, the configuration of the middle opening 59 can be attached to have the configuration shown in FIG. 8 with a lower oval portion 62 and a narrower upwardly extending portion. Further, the particular pivoting attachment between the adjuster bar 26 and the lever 36 can take the alternative form of a sliding pin fixed within the lever 36 or bar 26, or one or more spring-biased pins disposed within the lever 36 or bar 26. Apart from combining the different features of the above embodiments in varying ways, other modifications are also considered to be within the scope of the invention by the following claims which particularly point out and distinctly claim the subject matter regarded as the invention.

We hereby claim:

1. An apparatus for use in removing a plug member from a bushing disposed on a transformer in conjunction with a plug member removing tool, the apparatus comprising:

a) a plug engaging member;

b) a first bar fixed to the plug engaging member;

c) a second bar pivotally secured to the first bar and including a first opening adapted to receive a part of the plug member; and d) a pulling member releasably attached to the second bar at a position spaced from the first opening opposite the first bar.

2. The apparatus of claim 1 wherein the second bar is pivotally secured to the first bar by a pin releasably inserted through aligned pivot openings in the second bar and the first bar.

3. The apparatus of claim 2 wherein the first bar includes a number of aligned pairs of pivot openings spaced from one another along the first bar.

4. The apparatus of claim 2 wherein the second bar includes a second opening spaced from the first opening opposite the pulling member and through which the first bar is movably inserted.

5. The apparatus of claim 1 wherein the pulling member is releasably secured to a third opening in the second bar spaced from the first opening.

6. The apparatus of claim 5 wherein the pulling member includes a hook releasably engageable with the third opening and a rope engaged with the hook.

7. The apparatus of claim 1 wherein the plug engaging member is cylindrical in shape.

8. The apparatus of claim 7 wherein the plug engaging member includes a longitudinal slot extending along the engaging member.

9. The apparatus of claim 8 wherein the plug engaging member is a load break elbow.

10. The apparatus of claim 1 wherein the plug engaging member, first bar and second bar are formed from an electrically insulative material.

11. The apparatus of claim 1 further comprising a pulling tool including an elongate rod having a gripping end engageable with the apparatus and a handle opposite the gripping end.

12. The apparatus of claim 11 wherein the gripping end of the rod is engaged with the first bar.

13. The apparatus of claim 11 wherein the gripping end of the rod is engaged with the second bar.

14. The apparatus of claim 11 wherein the second bar is formed with a central portion and a pair of side walls extending perpendicularly from each side of the central portion.

15. The apparatus of claim 14 wherein the side walls include apertures positioned on opposite sides of the first bar.

16. A tool assembly for removing a plug member from a bushing on a transformer, the assembly comprising:

a) a pulling tool including an elongate rod having a gripping end and a handle opposite the gripping end; and b) a tool attachment engageable with the gripping end; the attachment including a plug engaging member, a first bar fixed to the plug engaging member, a second bar pivotally secured to the first bar and a pulling member attached to the second bar opposite the first bar.

17. The assembly of claim 16 wherein the gripping end of the rod is engaged with the first bar.

18. The assembly of claim 16 wherein the gripping end of the rod is engaged with the second bar.

19. The assembly of claim 16 wherein the second bar is formed with a central portion and a pair of side walls extending perpendicularly from each side of the central portion.

20. The assembly of claim 19 wherein the side walls include apertures positioned on opposite sides of the first bar.

* * * * *